US009551774B2

(12) United States Patent
Ishida et al.

(10) Patent No.: US 9,551,774 B2
(45) Date of Patent: Jan. 24, 2017

(54) RFID TAG SEARCH METHOD, NON-TRANSITORY STORAGE MEDIUM STORING RFID TAG SEARCH PROGRAM, AND RFID TAG SEARCH DEVICE

(71) Applicant: NTT DOCOMO, INC., Chiyoda-ku (JP)

(72) Inventors: Masanori Ishida, Chiyoda-ku (JP); Shigeru Sekiguchi, Chiyoda-ku (JP); Kouki Hayashi, Chiyoda-ku (JP); Shin Nakamatsu, Chiyoda-ku (JP); Ryuutarou Hosoi, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/762,995

(22) PCT Filed: Apr. 8, 2014

(86) PCT No.: PCT/JP2014/060183
§ 371 (c)(1),
(2) Date: Jul. 23, 2015

(87) PCT Pub. No.: WO2014/175063
PCT Pub. Date: Oct. 30, 2014

(65) Prior Publication Data
US 2015/0355308 A1    Dec. 10, 2015

(30) Foreign Application Priority Data

Apr. 23, 2013    (JP) ................................. 2013-090795

(51) Int. Cl.
*H04W 24/00*    (2009.01)
*G01S 1/04*    (2006.01)
(Continued)

(52) U.S. Cl.
CPC .................. *G01S 1/04* (2013.01); *G01S 1/047* (2013.01); *G01S 5/0263* (2013.01); *G01S 5/12* (2013.01);
(Continued)

(58) Field of Classification Search
CPC .. G06K 7/0008; G06Q 10/087; H04B 5/0062; G01S 13/82; G01S 13/878; G01S 1/04; G01S 1/047; G01S 5/0263; G01S 5/12; H04W 84/18; H04W 52/0216; H04W 84/12; H04W 48/12; H04W 4/008; H04W 8/005; H04M 1/7253; H04M 1/72544
(Continued)

(56) References Cited

U.S. PATENT DOCUMENTS 7,602,293 B2    10/2009    Taki et al.
8,676,273 B1 *    3/2014    Fujisaki .............. H04M 1/6505
379/142.06
(Continued)

FOREIGN PATENT DOCUMENTS

EP    1 708 439 A1    10/2006
JP    2005-263480    9/2005
(Continued)

OTHER PUBLICATIONS

International Search Report Issued Jun. 3, 2014, in PCT/JP2014/060183 filed Apr. 8, 2014.
(Continued)

*Primary Examiner* — Mahendra Patel
(74) *Attorney, Agent, or Firm* — Oblon, McClelland, Maier & Neustadt, L.L.P.

(57) ABSTRACT

A method to be executed by a user terminal for searching for locations of one or more wireless devices that are located within an area in which the one or more wireless devices can
(Continued)

wirelessly communicate with the user terminal, wherein each of the one or more wireless devices periodically transmits a beacon signal. The method includes detecting a number of the one or more wireless devices that are located within the area based on the beacon signals; determining a transmission period for transmitting the beacon signals depending on the number of the one or more wireless devices; and instructing the one or more wireless devices that are located within the area to transmit the beacon signals in accordance with the determined transmission period.

8 Claims, 9 Drawing Sheets

(51) Int. Cl.
H04W 72/12 (2009.01)
H04W 4/00 (2009.01)
G01S 5/02 (2010.01)
G01S 5/12 (2006.01)
H04W 8/00 (2009.01)
H04M 1/725 (2006.01)

(52) U.S. Cl.
CPC .............. *H04W 4/00* (2013.01); *H04W 4/008* (2013.01); *H04W 72/12* (2013.01); *H04M 1/7253* (2013.01); *H04M 1/72544* (2013.01); *H04M 2250/04* (2013.01); *H04W 8/005* (2013.01)

(58) Field of Classification Search
USPC ...... 455/456.1, 63.1, 106, 277.2; 340/572.1; 707/628
See application file for complete search history.

(56) References Cited

U.S. PATENT DOCUMENTS

| | | | | |
|---|---|---|---|---|
| 2003/0163579 | A1* | 8/2003 | Knauerhase | H04W 16/06 709/230 |
| 2005/0025092 | A1* | 2/2005 | Morioka | H04W 74/002 370/328 |
| 2006/0221927 | A1* | 10/2006 | Yamada | G06F 21/606 370/345 |
| 2006/0223519 | A1* | 10/2006 | Yahagi | H04W 48/02 455/421 |
| 2007/0200665 | A1* | 8/2007 | Studerus | G07C 1/10 340/5.61 |
| 2008/0123683 | A1* | 5/2008 | Cheng | H04M 7/0036 370/464 |
| 2009/0036153 | A1 | 2/2009 | Yamazaki et al. | |

FOREIGN PATENT DOCUMENTS

| | | |
|---|---|---|
| JP | 2006-248745 | 9/2006 |
| JP | 2007-221347 | 8/2007 |
| JP | 2007-243240 | 9/2007 |
| JP | 2007-256180 | 10/2007 |
| JP | 2008-17380 | 1/2008 |
| JP | 2008-040550 | 2/2008 |
| JP | 2009-017321 | 1/2009 |
| JP | 2009-100391 | 5/2009 |
| JP | 2009-152660 | 7/2009 |
| JP | 2011-049829 | 3/2011 |
| WO | WO 2005/125032 | 12/2005 |
| WO | WO 2007/091420 | 8/2007 |
| WO | WO 2011/071307 | 6/2011 |

OTHER PUBLICATIONS

Office Action Issued Apr. 7, 2015, in Japanese Patent Application No. 2014-052260, (with English-Language Translation).
Extended European Search Report issued Mar. 15, 2016 in Patent Application No. 14787809.4.

* cited by examiner

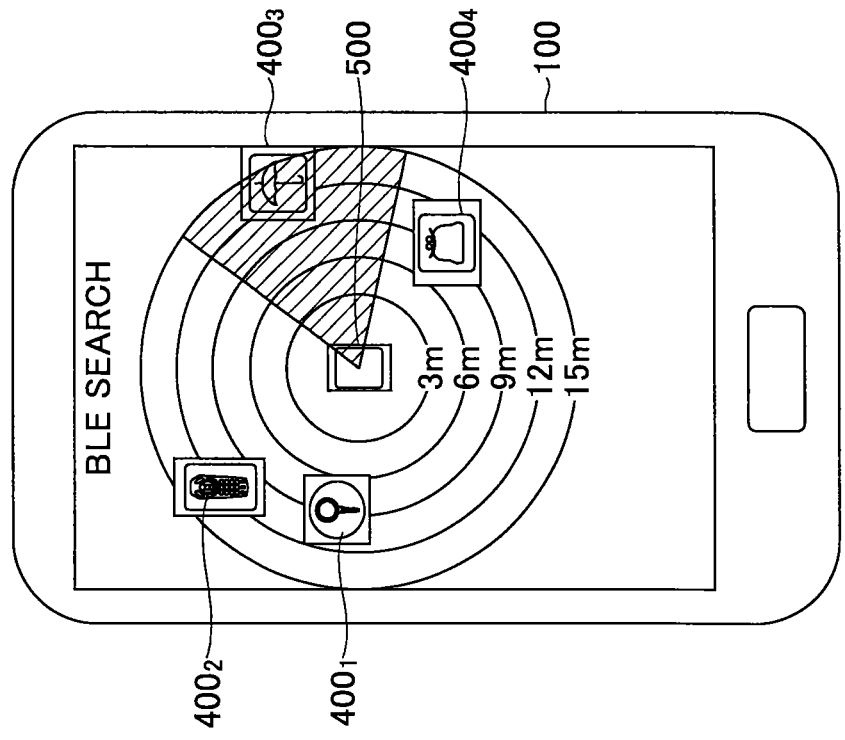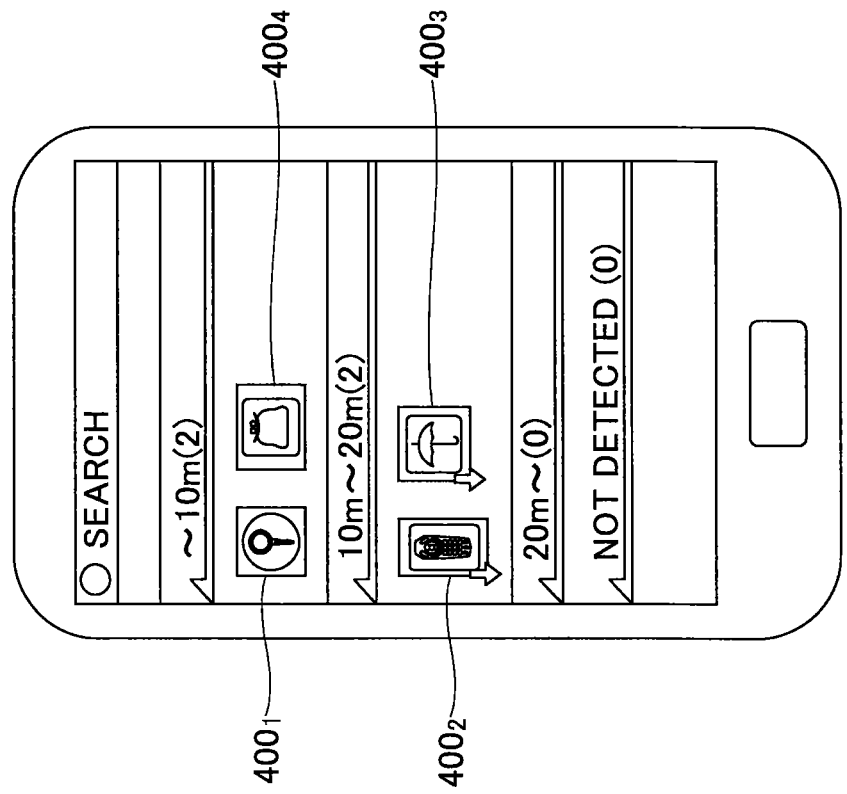

FIG.7

| NUMBER OF TAGS | LIST DISPLAY UPDATE INTERVAL [sec] | SIGNAL TRANSMISSION INTERVAL [msec] | | |
|---|---|---|---|---|
| | | STANDBY | LIST DISPLAY | SEARCH |
| 1~10 | 1 | 2000 | 100 | 100 |
| 11~20 | 3 | 2000 | 200 | 200 |
| 21~30 | 5 | 2000 | 500 | 300 |
| 30~ | 10 | 2000 | 1000 | 400 |

FIG.9

| ITEM | VALUE |
|---|---|
| THRESHOLD VALUE OF RADIO WAVE STRENGTH (a) [dBm] | −50 |
| THRESHOLD VALUE OF CHANGE IN RADIO WAVE STRENGTH (b) [dB] | 10 |
| STANDARD TRANSMISSION INTERVAL (c) [msec] | 1000 |

FIG.10

| RADIO WAVE STRENGTH CHANGED VALUE [dB] \ RADIO WAVE STRENGTH VALUE [dBm] | −51 | −52 | −53 | ... |
|---|---|---|---|---|
| 11 | 900 | 850 | 800 | ... |
| 12 | 850 | 800 | 750 | ... |
| 13 | 800 | 750 | 700 | ... |
| ... | ... | ... | ... | ... |

RFID TAG SEARCH METHOD, NON-TRANSITORY STORAGE MEDIUM STORING RFID TAG SEARCH PROGRAM, AND RFID TAG SEARCH DEVICE

TECHNICAL FIELD

The present invention relates to a search method and a search device that use a wireless device, and more specifically to a method and device for searching for a position of a radio frequency identification (RFID) tag using a wireless device.

BACKGROUND ART

An RFID tag can be attached to a to-be-identified object, such as a product or a person, and it has been used for logistics management or entering/leaving management at a station or at an office. For example, an RFID tag may store attribute information of a to-be-identified product to which the tag is attached. The RFID tag can be used by a user to identify the attribute information or the current location of the product to which the tag is attached, when the user's wireless terminal accesses the RFID tag.

For example, the following wireless search device has been known as a means for searching for a current location of an active RFID tag. First, the wireless search device queries an RFID tag to transmit an identification (ID) number.

Subsequently, the wireless search device that receives a radio wave that is transmitted from the RFID tag estimates a distance and a direction from the wireless device to the RFID tag based on reception intensity of the radio wave, an arrival direction of the radio wave, and the like. Finally, the wireless search device associates the estimated location with the ID number of the RFID tag, and displays the estimated location that is associated with the ID number of the RFID tag. At this time, in order to scan in all directions for the direction in which the RFID tag is located, it may be required to vary the antenna directivity for receiving a signal over 360 degrees by manually changing the direction of the wireless search device over 360 degrees for each search operation, or by application of beam-forming technology.

In such a system that is for searching for the current location of an RFID tag, when a transmission interval of transmitting signals from the RFID tag is too large, performance of searching for the tag (e.g., search accuracy or a search success rate) may be degraded, and when a transmission interval of transmitting signals from the RFID tag is too small, battery energy consumption may be increased because of a likelihood of collisions by simultaneous transmissions from a plurality of tags and frequent transmissions. Thus, in the above-described RFID tag search system, a technique may be required that is for adjusting the transmission interval for transmitting the signals depending on a situation.

Patent Document 1 discloses a terminal location search device for locating a position of a mobile terminal based on a positioning signal from the mobile terminal, as a scheme for adjusting the transmission interval of transmitting the signals depending on a situation in the above-described RFID tag search system. Specifically, the terminal location search device may transmit a control signal for adjusting the transmission interval for periodically transmitting positioning signals to the mobile terminal depending on current moving velocity of the mobile terminal, and the mobile terminal that receives the control signal may transmit a positioning signal at every time interval that is indicated by the terminal location search device. Namely, the terminal location search device can prevent positioning accuracy from being degraded by adjusting the transmission interval for transmitting positioning signals at high moving speed to be smaller than the transmission interval for transmitting positioning signals at low moving speed.

As a technical effort to overcome the problem of the increase in likelihood of collisions by frequent simultaneous transmissions from the above-described plurality of radio wave sources, Patent Document 2 discloses a communication system and a base station for improving a throughput by preventing signals from interfering with each other between mobile terminals. Specifically, the base station apparatus monitors the number of the mobile terminals (users) that are located within its own cell. At the same time, in response to the number of the mobile terminals, the base station apparatus transmits, from an RF transmitter, control information (frame format identification information) to the mobile terminals that are located within its own cell. Here, the control information is for controlling a frame format of a RACH depending on the number of the mobile terminals. At this time, the base station apparatus may execute control so that, as the number of the mobile terminals within the cell is increased, an amount of overhead information that is included in a frame having a frame format that corresponds to the number is reduced. In this manner, the amount of the overhead information is reduced depending on the number of the users, and a RACH frame whose length is shortened by the corresponding reduction amount can be transmitted. Thus, even if the number of the users is increased, a likelihood of occurrence of collision between frames on the RACH can be reduced, and the throughput can be enhanced.

Further, in the invention disclosed in Patent Document 3, the tag search device may switch power control operation for radio transmission and reception, depending on whether the current operating state of the device itself is a search state for searching for a desired RFID tag, or the current operating state of the device itself is a communication continuation state in which the tag search device is communicating with the detected RFID tag. Specifically, for radio transmission and reception by the device itself, in the search state, the device switches to a power control mode that corresponds to high antenna output power, and in the communication continuation state, the device switches to a power control mode that corresponds to antenna output power that is lower than that.

RELATED ART DOCUMENT

Patent Document

[PATENT DOCUMENT 1] Japanese Unexamined Patent Publication No. 2011-049829
[PATENT DOCUMENT 2] Re-publication of PCT International Publication No. 2007/091420
[PATENT DOCUMENT 3] International Publication WO 2011/071307

SUMMARY OF THE INVENTION

Problem to be Solved by the Invention

It is desired that the degradation of performance of searching for the RFID tag that is located far away can be compensated for, and that a user can be quickly and highly frequently notified of the distance to the RFID tag and its change, prior to loosing the RFID tag that is highly likely to move outside the coverage.

Further, it is desired that the likelihood of collision that is caused by the simultaneous transmissions from many RFID tags can be reduced without implementing a scheme for strict bit synchronization and frame synchronization between the tag search device and the RFID tag. Furthermore, it is desired to resolve the tradeoff between the battery consumption of the RFID tag that can be caused by a short transmission interval for transmitting signals from the RFID tag and the degradation of the performance of searching for the tag that is caused by a long transmission interval.

Means for Solving the Problem

According to an aspect of the present invention, there is provided a method to be executed by a user terminal for searching for locations of one or more wireless devices that are located within an area in which the one or more wireless devices can wirelessly communicate with the user terminal, wherein each of the one or more wireless devices periodically transmits a beacon signal, the method including a step of detecting a number of the one or more wireless devices that are located within the area based on the beacon signals; a step of determining a transmission period for transmitting the beacon signals depending on the number of the one or more wireless devices; and a step of instructing the one or more wireless devices that are located within the area to transmit the beacon signals in accordance with the determined transmission period.

According to another aspect of the present invention, there is provided a non-transitory recording medium that stores a program to be executed by a control circuit within a user terminal for searching for locations of one or more wireless devices that are located within an area in which the one or more wireless devices can wirelessly communicate with the user terminal, wherein each of the one or more wireless devices periodically transmits a beacon signal, wherein the program causes the control circuit to execute a step of detecting a number of the one or more wireless devices that are located within the area based on the beacon signals; a step of determining a transmission period for transmitting the beacon signals depending on the number of the one or more wireless devices; and a step of instructing the one or more wireless devices that are located within the area to transmit the beacon signals in accordance with the determined transmission period.

According to another aspect of the present invention, there is provided a user terminal that is used for searching for locations of one or more wireless devices that are located within an area in which the one or more wireless devices can wirelessly communicate with the user terminal, wherein each of the one or more wireless devices periodically transmits a beacon signal, the user terminal including a detection unit configured to detect a number of the one or more wireless devices that are located within the area based on the beacon signals; a determination unit configured to determine a transmission period for transmitting the beacon signals depending on the number of the one or more wireless devices; and an instruction unit configured to instruct the one or more wireless devices that are located within the area to transmit the beacon signals in accordance with the determined transmission period.

According to another aspect of the present invention, there is provided a method to be executed by a user terminal for searching for locations of one or more wireless devices that are located within an area in which the one or more wireless devices can wirelessly communicate with the user terminal, wherein each of the one or more wireless devices periodically transmits a beacon signal, the method including a step of detecting a radio wave strength of a signal that is received from, at least, each of the one or more wireless devices within the area; a step of determining transmission periods for transmitting the beacon signals based on the detected radio wave strength; and a step of instructing each of the one or more wireless devices that are within the area to transmit the beacon signal in accordance with the determined transmission period.

According to another aspect of the present invention, there is provided a non-transitory recording medium that stores a program to be executed by a control circuit within a user terminal for searching for locations of one or more wireless devices that are located within an area in which the one or more wireless devices can wirelessly communicate with the user terminal, wherein each of the one or more wireless devices periodically transmits a beacon signal, wherein the program causes the control circuit to execute a step of detecting a radio wave strength of a signal that is received from, at least, each of the one or more wireless devices within the area; a step of determining transmission periods for transmitting the beacon signals based on the detected radio wave strength; and a step of instructing each of the one or more wireless devices that are within the area to transmit the beacon signal in accordance with the determined transmission period.

According to another aspect of the present invention, there is provided a user terminal that is used for searching for locations of one or more wireless devices that are located within an area in which the one or more wireless devices can wirelessly communicate with the user terminal, wherein each of the one or more wireless devices periodically transmits a beacon signal, the user terminal including a detection unit configured to detect a radio wave strength of a signal that is received from, at least, each of the one or more wireless devices within the area; a determination unit configured to determine transmission periods for transmitting the beacon signals based on the detected radio wave strength; and an instruction unit configured to instruct each of the one or more wireless devices that are within the area to transmit the beacon signal in accordance with the determined transmission period.

Effect of the Present Invention

The tag search device according to the embodiment of the present invention can automatically set a transmission interval for transmitting signals from the RFID tag to be an optimum value by considering a distance to each of the RFID tags to be searched for by the tag search device and speed of the RFID tag for moving away from the tag search device. Namely, the tag search device according to the embodiment of the present invention can set the transmission interval for transmitting the signals to be small as the RFID tag is separated away from the tag search device, or the tag search device according to the embodiment of the present invention can set the transmission interval for transmitting the signals to be much smaller as the moving speed of the RFID tag along a direction in which the RFID tag moves away from the tag search device becomes greater. As a result, the tag search device according to the embodiment of the present invention can compensate for the degradation of the performance (accuracy of the search or a success rate of the search) of searching for the RFID tag that is located at a remote distance by an increase in the frequency of transmitting signals. At the same time, the tag search device according to the embodiment of the present invention can quickly and highly frequently notify a user of a distance to the RFID tag and its change, prior to loosing the RFID tag that is highly likely to move outside the search range.

Furthermore, the tag search device according to the embodiment of the present invention can automatically set the transmission interval for transmitting signals from the RFID tag to be an optimum value by considering a list display on a search screen of the tag search device or a number of the RFID tags to be searched for. In this manner, the tag search device according to the embodiment of the present invention can reduce the likelihood of the collision that is caused by simultaneous transmissions from many RFID tags, and at the same time, the tag search device according to the embodiment of the present invention can resolve the tradeoff between the battery energy consumption of the RFID tag that can be caused by the short transmission interval for transmitting the signals and the degradation of the performance of searching for the tag that can be caused by the long transmission interval for transmitting the signals. As a result, the tag search device according to the embodiment of the present invention can prevent increase of a collision probability that may be caused by frequent simultaneous transmissions from many RFID tags that are located within a search range, without implementing a radio channel synchronization feature and a power control feature that are the same levels as those of a mobile terminal.

BRIEF DESCRIPTION OF THE DRAWINGS

FIGS. 3A and 3B are diagrams illustrating functions that are provided by an RFID tag search application to a user;

FIG. 7 is a diagram showing a transmission interval setting value table that defines correspondence between a number of tags and a setting value for a transmission interval for transmitting radio beacon signals;

FIG. 9 is a table that lists threshold values that are to be referred to for determining the transmission interval for transmitting signals; and FIG. 10 is a setting value table for determining the transmission interval for transmitting signals from radio wave reception strength and its decreased amount.

EMBODIMENTS FOR CARRYING OUT THE INVENTION

Figure 1:
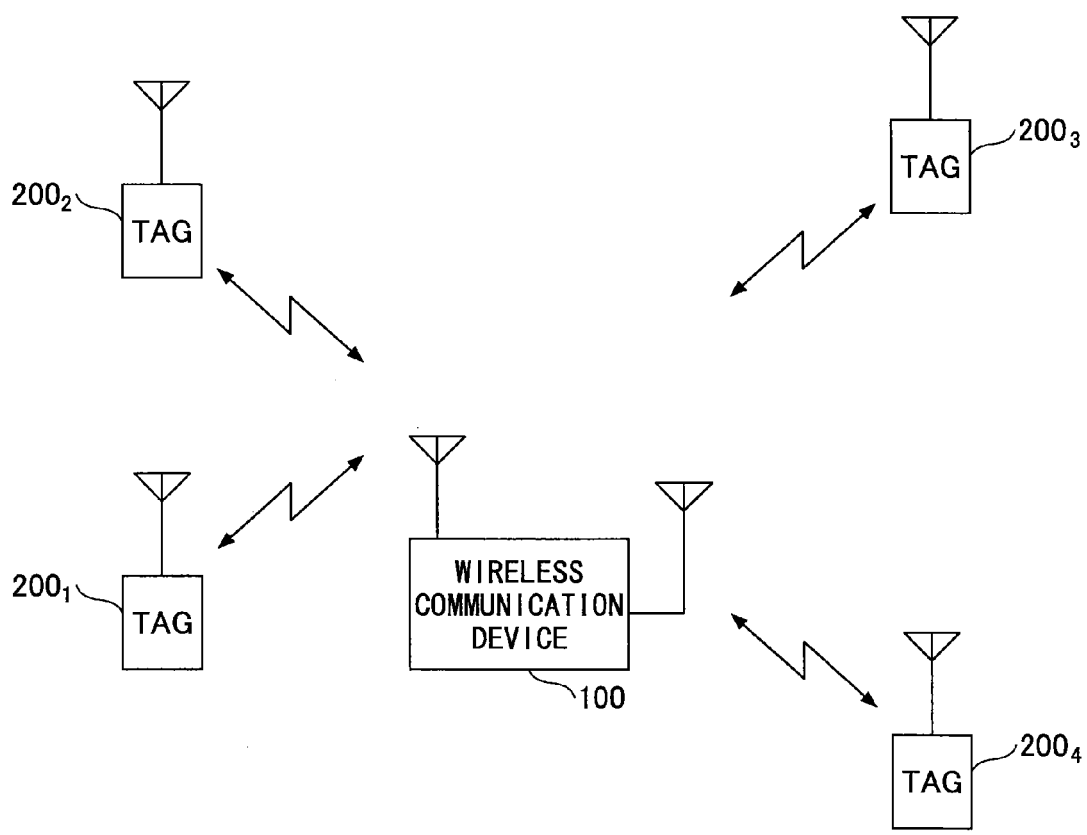
FIG. 1 is a diagram showing a configuration of a whole radio communication system according to an embodiment of the present invention.

The terminal location search device that is disclosed in Patent Document 1 uniformly shortens the transmission interval for transmitting positioning signals regardless of whether the mobile terminal is moving around the terminal location search device at high speed along a close periphery of the terminal location search device or the mobile terminal is moving at high speed toward an outer edge of a search range. Accordingly, when the mobile terminal is moving around the terminal location search device at high speed along a close periphery of the terminal location search device, power may be consumed more than necessary for transmitting positioning signals. That is because, when the mobile terminal is moving around the terminal location search device along a close periphery of the terminal location search device, reception strength of a radio wave and a radio propagation condition are favorable in many cases. Thus, even if the mobile terminal is moving at high speed, positioning can be made that is satisfactory to some extent without shortening the transmission interval for transmitting the positioning signals.

Further, another problem with the invention that is disclosed in Patent Document 1 is that the invention that is disclosed in Patent Document 1 does not include a scheme for resolving the following problem. A mobile terminal that is at a location separated away from the terminal location search device or a mobile terminal that is separated from the terminal location search device may move outside a coverage area that is centered on the terminal location search device in the near future. Here, radio communications are possible within the coverage area. Thus, for a mobile terminal that is located at an outer edge of the coverage area in which radio communications are possible, or for a mobile terminal that attempts to move outside the coverage area in which radio communications are possible, change in location of the mobile terminal that can be possibly missed by the terminal location search device may not be quickly provided to a user, unless the transmission interval for transmitting positioning signals is shortened regardless of the moving speed of the mobile terminal.

Further, for achieving a scheme for transmitting a RACH frame in which an amount of the overhead information is reduced in proportion to the number of the mobile terminals that are located within a cell and whose length is shortened by the amount, as that of Patent Document 2, the following scheme may be required between a mobile terminal and a base station apparatus. Namely, it may be required to achieve strict bit synchronization and frame synchronization between the mobile terminal and the base station apparatus, so that it conforms to a channel timing structure and a frame format of a radio channel, such as a RACH.

However, when a synchronization function that is equivalent to that of a mobile terminal is attempted to be implemented in an active RFID tag search system so as to establish strict bit synchronization and frame synchronization on a radio channel, the following problem may occur. By implementing such a synchronization function in an RFID tag, signal processing can be very complicated in the RFID tag, and power that is consumed by the RFID tag for signal processing can be significantly increased. As a consequence, in the RFID tag, an area for implementing an RF circuit may be increased or the capacity of the battery may be required to be increased. Thus, the size of the RFID tag can be unnecessarily enlarged and the RFID tag can be complicated, and the producing cost can also be increased, beyond the original purposes of identifying attribute information of a product to which the tag is attached and searching for a current location of the product.

Further, as described in Patent Document 3, for switching power control operation for radio transmission and reception on a wireless search device depending on whether it is in a search state or it is in a communication continuation state in which it is communicating with the detected RFID tag, a problem may occur that is the same as the above-described problem that is related to Patent Document 2. Namely, implementing a complicated power control function in an RFID tag that is for executing closed-loop power control or open-loop power control that is the same level of that of a mobile terminal can cause a problem that the size of the RFID tag can be unnecessarily enlarged and the RFID tag can be complicated, and the producing cost can be increased, beyond the original purposes of identifying attribute information of a product to which the tag is attached and searching for a current location of the product.

<1> Overview

An RFID tag can be attached to a to-be-identified object, such as a product or a person, and it has been used for logistics management or entering/leaving management at a station or at an office. RFID tags can be roughly classified into a passive type and an active type.

A passive type RFID tag does not include a battery. The passive type RFID tag can generate necessary power in it from a radio wave from an external reader/writer. The passive type RFID tag can communicate with the reader/writer in a way that the passive type RFID tag responds to a command from the reader/writer. The communication range may not be so large, and it is approximately 1 m at most. However, it can be downsized and it can operate for a long time. From that, the future spread is greatly expected.

An active type RFID tag includes a battery in it. The active type RFID tag can transmit, by itself, a radio wave to an external receiver. The communication range can be wide, such as 10 to 20 m, because it includes the battery. However, there are disadvantages that it may not be downsized because it includes the battery, and that the battery life is limited. However, since it is possible to actively transmit information, various applications can be considered by suitably utilizing its function. For example, an active type RFID tag is more suitable than a passive type RFID tag for searching for a to-be-identified object that exists in an unspecified location.

As an active type RFID tag, a small RFID tag and the like are known that utilize a short range radio communication standard, such as Bluetooth (registered trademark). For example, a small tag is provided that utilizes the Bluetooth Low Energy Wireless Technology. Further, as another example, there is a method for estimating a location of a tag by a position of a GPS module. In this method, the GPS module is included in an RFID tag, in addition to an RF module.

An active type RFID tag may always be required to transmit a beacon signal at every constant period. However, when the transmission interval for transmitting the beacon signals is short, battery energy can be quickly consumed, and it may be necessary to frequently replace (or recharge) the battery. Moreover, when there are many RFID tags in an area that can be searched by an RFID tag search device, the RFID tag search device may not normally receive signals from the RFID tags due to collision of beacon signals that are transmitted from the RFID tags. However, when the transmission interval for transmitting the beacon signals is increased, a time interval for the RFID tag search device to provide a distance to the RFID tag based on a strength level of the received signal to the user is also increased. Thus, search performance of the RFID tag (search accuracy and a search success rate) may be degraded. A situation in which the above-described problem may occur can be more specifically illustrated in detail as follows.

The transmission interval for transmitting beacon signals from an active RFID tag can be automatically switched in the following manner depending on a situation. Specifically, the transmission interval for transmitting the beacon signals can be set to three different values depending on three different situations. The above-described three different situations include the following states (1) to (3).

(1) A standby state in which no RFID tag is set as a search target.

(2) A state in which the RFID tag search device list-displays all RFID tags that are located in an area that can be searched by the RFID tag search device, and the RFID tags are list-displayed together with other tags that are located in the area.

(3) A state in which an RFID tag is specified as a search target by tag ID information, and a current location of the RFID tag is searched for by the RFID tag search device.

Especially, in the standby state of (1), battery energy consumption can be reduced by setting the transmission interval for transmitting the beacon signals to be a relatively long interval, such as 2 seconds to 5 seconds.

In the above-described state (2), by transmitting, from the RFID tag search device to an RFID tag, an instruction signal that is for instructing the RFID tag to change setting of the transmission interval for transmitting the beacon signals, the beacon signals can be received from each RFID tag with a relatively short transmission interval, such as approximately one second.

In the above-described state (3), by transmitting, from the RFID tag search device to an RFID tag, an instruction signal that is for instructing the RFID tag to change setting of the transmission interval for transmitting the beacon signals, the beacon signals can be received from each RFID tag with the smallest transmission interval of approximately several hundreds milliseconds, for example.

When the search for the RFID tag is completed, and the state returns from the above-described state (3) to the above-described state (1) or (2), the RFID tag search device instructs the RFID tag to change the transmission interval for transmitting the beacon signals to a setting value corresponding to the state.

Further, when a constant time period has elapsed from the reception of the instruction signal for instructing to set the transmission interval for transmitting the beacon signals to be small, the active RFID tag automatically changes the transmission interval for transmitting the beacon signals to be the setting at the above-described standby state (1). In this manner, even if the RFID tag moves outside an area that can be searched by the RFID tag search device with the setting of the short transmission interval for transmitting the beacon signals, unnecessary battery energy consumption can be suppressed.

In order to reduce the time period that is required to estimate the current location of the RFID tag in the above-described state (2) or (3), the above-described setting value for transmission interval can be set to be short. Especially, it is possible that, in the near future, the RFID tag that is separated away from the RFID tag search device or the RFID tag that is separating from the RFID tag search device may move outside the coverage area that is centered on the RFID tag search device, and in which radio communications are possible. Thus, it is desirable to set the transmission interval for transmitting the beacon signals from the RFID tag to be small, so that a change in the current position of the RFID tag, which can be missed by a user, can be quickly provided to the user.

However, when the transmission interval for transmitting the beacon signals is set to be short, the following problem may occur as the number of the RFID tags increases that are located in the coverage area in which the RFID tag search device can execute radio communications. Namely, the probability of collision among beacon signals that are simultaneously transmitted from many RFID tags is increased. Thus, list-displaying of all the RFID tags that are located in the coverage area may not be normally executed on the display screen of the RFID tag search device. Moreover, in order to enhance display response performance in the above-described list display of all the RFID tags located in the coverage area, it may be necessary to shorten an update interval for updating the list display on the display screen. However, the display may become unstable, unless the transmission interval for transmitting the beacon signals from the RFID tag is sufficiently smaller than the update interval.

However, for the RFID tag that is located at an outer edge of the coverage area in which radio communications are possible, or for the RFID tag that attempts to move outside the coverage area in which radio communications are possible, a change in position of the RFID tag, which can be missed by a user, may not be quickly and frequently provided to the user, unless the transmission interval for transmitting signals is set to be short.

As described above, in the system for searching for the current location of the active RFID tag, there is a problem that, when the transmission interval for transmitting signals from an RFID tag is too large, the performance of searching for the tag (search accuracy or a search success rate) is degraded, and when the transmission interval for transmitting signals from an RFID tag is too small, battery energy consumption is increased that is due to the collision probability and frequent transmissions by simultaneous transmissions from a plurality of tags. However, for the RFID tag that is located at an outer edge of the coverage area in which radio communications are possible, or for the RFID tag that attempts to move outside the coverage area in which radio communications are possible, it is highly likely that a user may miss the RFID tag unless the transmission interval for transmitting signals is set to be short. Thus, the present embodiment discloses, for the above-described system for searching for the active RFID tag, a technique for adjusting the above-described transmission interval for transmitting the signals to be an optimized length depending on a situation.

<2> A Configuration of a Radio Communication System According to the Embodiment (2-1) Overall Configuration of the Radio Communication System An embodiment of an overall configuration of a radio communication system is described below by referring to FIG. 1.

The embodiment of the radio communication system includes a tag search device 100 that is used by a user as a portable user terminal device for searching for an RFID tag; and a tag 200$n$ (n is a positive integer that is less than or equal to a positive integer m) that is an active RFID tag. FIG. 1 shows a case of m=4, as an example. The value of m may be 1 to 3, or it may be greater than or equal to 5.

The tag 200$n$ may be referred to as an extension. The tag 200$n$ includes a short range radio communication module. For example, the tag 200$n$ may be a small RFID tag that can execute short range radio communication in accordance with the Bluetooth Low Energy Wireless Technology. The tag 200$n$ can be attached to various objects. For example, the tag 200$n$ can be attached to something that is not to be lost. In one embodiment of the radio communication system, the tag 200$n$ may be attached to a key, a remote controller, an umbrella, a purse, and so forth.

The tag 200$n$ is an active RFID tag. Since it is driven by a built-in battery, it can actively transmit a radio signal to another radio device. The tag 200$n$ can discontinuously transmit a beacon signal at every constant period so as to report its current location. The transmission period of transmitting beacon signals can be set by a setting command from the base unit that is described below. Further, the tag 200$n$ can report the current transmission period and transmission power to the base unit.

The tag search device 100 may be referred to as a "base unit." A short range radio communication module of the tag search device 100 can execute radio communications with the short range radio communication module of the tag 200$n$. The tag search device 100 can measure electric field strength of a radio wave from the tag 200$n$. A built-in sensor of the tag search device 100 can detect a moving state of the tag search device 100. The tag search device 100 can estimate a location of the tag 200$n$ based on the electric field strength of the radio wave from the tag 200$n$ and the moving state that is detected by the sensor. The tag search device 100 includes a display screen that includes a user interface that can be intuitively operated by a user, such as a Graphical User Interface (GUI), and the display screen can display a location of the tag 200$n$. Note that the tag search device 100 can identify a plurality of RFID tags at the same time and list-display all the identified RFID tags on the display screen by simultaneously estimating the locations of the tags 200$n$.

(2-2) RFID Tag 200$n$

Figure 2A:
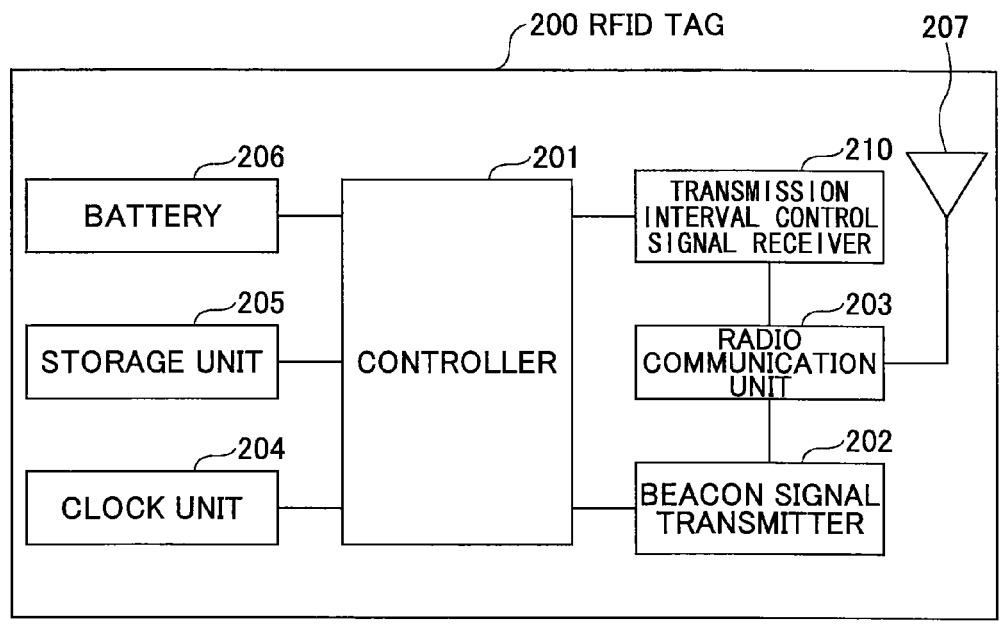
FIG. 2A is a diagram showing a hardware configuration of an RFID tag according to the embodiment of the present invention.

FIG. 2A shows an embodiment of the tag 200$n$.

In an embodiment of the radio communication system, a tag 200$_1$ is attached to a key, a tag 200$_2$ is attached to a remote controller, a tag 200$_3$ is attached to an umbrella, and a tag 200$_4$ is attached to a purse.

The tag 200$n$ may include a controller 201; a beacon signal transmitter 202; a radio communication unit 203; a clock unit 204; a storage unit 205; a battery 206; a transmission/reception antenna 207; and a transmission interval control signal receiver 210.

The controller 201 may be implemented by a general purpose microprocessor, a digital signal processor, or the like. The controller can control the overall operation of the tag 200$n$.

The beacon signal transmitter 202 can be connected to the controller 201 and to the radio communication unit 203 in a manner that it is interposed between them. The beacon signal transmitter 202 can control the radio communication unit 203, so that the radio communication unit 203 transmits a beacon signal at every transmission period that is set by the tag search device 100 that is the base unit. Specifically, the beacon signal transmitter 202 can count down an inner counter value by a number of clock pulses that is set by the controller 201, and when the counter value becomes zero, the beacon signal transmitter 202 instructs the radio communication unit 203 to execute transmission of a beacon signal.

The radio communication unit 203 is connected to the beacon signal transmitter 202 and the transmission/reception antenna 207 in a manner that it is interposed between them. The radio communication unit 203 may execute radio communication in accordance with a short range radio communication standard, such as the Bluetooth standard, the Zigbee standard, the Wi-Fi standard, or the ANT+ standard. The short range radio communication module is not limited by the Bluetooth, the Zigbee, the Wi-Fi, and the ANT+, and it may execute radio communications in accordance with a short range radio communication standard other than these standards. In one embodiment of the tag 200n, a case is explained in which the radio communication unit 203 executes short range radio communications in accordance with the Bluetooth Low Energy Wireless Technology.

The clock unit 204 can measure, each time a transmission period for transmitting beacon signals is newly set by the base unit, a time length that is equal to the newly set transmission period. Then, the clock unit 204 can set a number of clock pulses that correspond to the measured time length for the beacon signal transmitter 202. At this time, the number of the clock pulses that is set by the clock unit 204 can be output to the beacon signal transmitter 202 from the clock unit 204 via the controller 201.

The storage unit 205 can store various setting parameters for the tag 200n. These setting parameters may include a setting value of the transmission interval for transmitting beacon signals in the standby state in which the tag 200n is not set as a target of the search, and a waiting time until the current transmission interval for transmitting the beacon signals is automatically reset to the setting value of the transmission interval for the standby state.

The battery 206 can supply power to the beacon signal transmitter 202, radio communication unit 203, the clock unit 204, the storage unit 205, and the transmission/reception antenna 207 via the controller 201.

The transmission interval control signal receiver 210 is connected to the controller 201 and the radio communication unit 203 in a manner that it is interposed between them. The transmission interval control signal receiver 210 can receive a control signal from the tag search device 100 that is the base unit. The control signal that is received by the transmission interval control signal receiver 210 from the tag search device 100 is a signal that is for transmitting a command for controlling, by the tag search device 100, the length of the period for transmitting the beacon signals from the tag 200n. The control signal is called "a transmission interval control signal."

(2-3) Tag Search Device 100

Figure 2B:
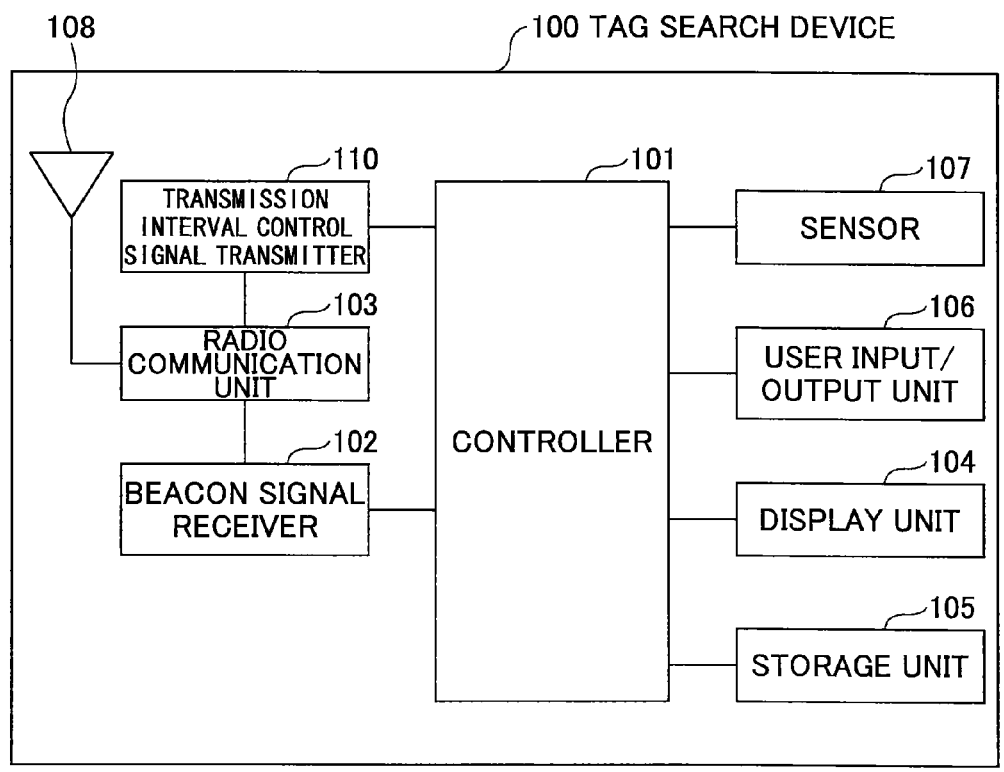
FIG. 2B is a diagram showing a hardware configuration of a tag search device according to the embodiment of the present invention.

FIG. 2B shows an embodiment of the tag search device 100.

The tag search device 100 may be any suitable terminal that allows a user to communicate. For example, the tag search device 100 includes a user terminal, such as a cellular phone, an information terminal, a personal digital assistant, a mobile personal computer, or a smart phone. However, it is not limited to these.

The tag search device 100 may include a controller 101; a beacon signal receiver 102; a radio communication unit 103; a display unit 104; a storage unit 105; a user input/output unit 106; a sensor 107; a transmission/reception antenna 108; and a transmission interval control signal transmitter 110.

The controller 101 may be implemented by a general purpose microprocessor, a digital signal processor, or the like. The controller can control the overall operation of the tag 200n. The controller 101 can execute control of the whole tag search device 100 by exchanging signals with the beacon signal receiver 102, the display unit 104, the storage unit 105, the user input/output unit 106, and the sensor 107. The controller 101 can function in accordance with a program that is stored in the storage unit 105, and the controller 101 can execute predetermined processes. Specifically, the controller 101 can estimate a location of the tag 200n based on the electric field strength of the radio wave from the tag 200n, and information indicating the moving state of the tag search device 100 (an orientation and a situation of the tag search device 100 and their changes). The location of the tag 200n that can be estimated by the controller 101 may be a relative position between the tag 200n and the tag search device 100. The controller 101 can output the information indicating the position of the tag 200n to the display unit 104.

The beacon signal receiver 102 can receive a radio signal from the tag 200n. When the received radio signal is a beacon signal, the beacon signal receiver 102 can extract radio tag identification information (tag ID information) of the tag 200n and attribute information of the product to which the tag is attached by decoding the information content of the received signal, and report them to the controller 101. In this manner, the tag search device 100 can uniquely identify the RFID tag that is the transmission source of the received signal, and at the same time, the tag search device 100 can identify the attribute information of the product to which the RFID tag is attached.

The radio communication unit 103 may execute radio communication in accordance with a short range radio communication standard, such as the Bluetooth standard, the Zigbee standard, the Wi-Fi standard, or the ANT+ standard. The radio communication unit 103 is not limited by the Bluetooth, the Zigbee, the Wi-Fi, and the ANT+, and it may execute radio communications in accordance with a short range radio communication standard other than these standards. In one embodiment of the tag search device 100, a case is explained in which the radio communication unit 103 executes short range radio communications in accordance with the Bluetooth Low Energy Wireless Technology. Further, the radio communication unit 103 can measure electric field strength based on a radio wave from the tag 200n. For example, the radio communication unit 103 can measure received signal strength (RSSI: Received Signal Strength Indication, Received Signal Strength Indicator) based on a radio wave from the tag 200n.

The display unit 104 may include a display, for example, and the display unit 104 can display a processing state or a processed result of the tag search device 100. The processing state or the processed result may include those by an OS or by an application. The display may include, a liquid crystal display (LCD), a cathode ray tube (CRT) display, a plasma display panel (PDP), or an organic electro-luminescence (EL) display, for example. When the tag search device 100 is executing the above-described RFID tag search application, the display unit 104 may collectively list-display locations of all the RFID tags that exist in the vicinity of the tag search device 100. Alternatively, during searching for a specific RFID tag that is specified as the target of the search by a user, the display unit 104 may display a search screen.

The storage unit 105 can store various setting parameters for the tag 200n. These setting parameters may include a setting value of the transmission interval for transmitting beacon signals in the standby state in which the tag 200n is not set as the target of the search, a setting value of the transmission period for transmitting the beacon signals when the locations of all the RFID tags that exist in the vicinity of the tag search device 100 are collectively list-displayed, and a setting value of the transmission period for transmitting the beacon signals during searching for the specific RFID tag that is specified as the target of the search by the user.

Further, the storage unit 105 may store an application and an operating system (OS). The application can be activated by a command that is input by a user from the user input/output unit 106. The application may include a program that is to be executed by the controller 101. The application may be software that includes a function for executing a task that is made by a user on the tag search device 100. The OS can be automatically activated at the start of the supply of power to the tag search device 100. The OS may include a system control program that is to be executed by the controller 101. The OS may be system software for providing, in the tag search device 100, application software with an interface that is obtained by abstracting the hardware. Note that the application in this embodiment includes the RFID tag search application that is for a user to search for the current location of the tag 200n, and that is for causing the display unit 104 to display the current location of the tag 200n by using the GUI.

The user input/output unit 106 may include a keyboard and a mouse, for example. The user input/output unit 106 is a unit for a user to provide an instruction to the tag search device 100, or for a user to perform data entry. Alternatively or additionally, the user input/output unit 106 may include a touch panel. Alternatively or additionally, the user input/output unit 106 may include a microphone, and the user input/output unit 106 may input sound that is emitted by a user. The sound may include a message to a recipient, or an instruction to the tag search device 100. The instruction may include an instruction to the OS or an instruction to the application. Alternatively or additionally, the user input/output unit 106 may include a speaker, and depending on a processing state or a processed result of the tag search device 100, the user input/output unit 106 may output sound to a user.

The sensor may include a movement sensor. The movement sensor can detect movement of a device that includes changes in an orientation and a state of the tag search device 100 that is held by a user. An embodiment of the movement sensor includes an acceleration sensor, a gyro sensor, and a terrestrial magnetism sensor. The movement sensor is not limited to the acceleration sensor, the gyro sensor, and the terrestrial magnetism sensor, and a sensor other than these may be included. The acceleration sensor is a sensor for measuring angular acceleration (rotational acceleration) and acceleration (linear acceleration) when the orientation or the state of the tag search device 100 is changed. The gyro sensor is a sensor for detecting a current orientation of the tag search device 100. The terrestrial magnetism sensor is a sensor for detecting the absolute direction, such as north, south, east and west, as viewed from the tag search device 100, based on the terrestrial magnetism.

The transmission interval control signal transmitter 110 is connected to the controller 101 and the radio communication unit 103 in a manner that it is interposed between them. The control signal that is transmitted by the transmission interval control signal transmitter 110 to the tag 200n is a signal that is for transmitting a command for controlling, by the tag search device 100, the length of the period for transmitting the beacon signals from the tag 200n. The control signal is called "a transmission interval control signal."

(2-4) Functions that are Provided to a User by the Tag Search Device 100 and an Embodiment for Using the Tag Search Device 100

Hereinafter, there are explained functions that are provided to a user by the tag search device 100 that is executing the RFID tag search application, by referring to FIGS. 3A and 3B. The RFID tag search application that is executed on the tag search device 100 can be implemented as an Android application that is executed by invoking an API of the Android OS (registered trademark). In this case, the RFID tag search application can be activated by a user by tapping a corresponding icon with a finger on a touch panel screen that displays a desk top of the Android OS (registered trademark). The RFID tag search application that is activated by the user may execute one of an intra-area tag list display mode and a specific tag search mode, which are specifically explained below. Switching between the intra-area tag list display mode and the specific tag search mode can be executed by providing, by a user, a switching instruction to the RFID tag search application via the user input/output unit 106, or by a determination by the application itself.

(2-4-A) the Intra-Area Tag List Display Mode

The intra-area tag list display mode is a mode of the tag search device 100 such that the tag search device 100 estimates distances to all RFID tags that are located within a searchable area, and the tag search device 100 list-displays the RFID tags on the display screen. Note that the above-described searchable area is the maximum range within which the tag search device 100 can receive a signal that is transmitted from an RFID tag that is separately located with reception quality that is greater than or equal to predetermined quality. The searchable area corresponds to a coverage area within which the tag search device 100 can execute radio communications. In this case, the predetermined quality may be reception quality with which the tag ID information can be extracted by correctly decoding a received signal from the RFID tag with a probability that is greater than or equal to a certain probability.

In the intra-area tag list display mode, the RFID tag search application that is executed by the tag search device 100 may store strength of a beacon signal that is received from each of the RFID tags in the storage unit 105. Subsequently, the RFID tag search application may list-display all the RFID tags that are located within the coverage area on the display screen of the tag search device 100 based on estimated distances to the corresponding RFID tags. For displaying the distances to the corresponding RFID tags, icon images are listed at positions corresponding to the distances. Here, each icon image represents tag ID information of the corresponding RFID tag.

FIG. 3A shows a situation in which the tag search device 100 list-displays all the RFID tags that are located within a searchable area.

Subsequently, a user taps, with a finger, one or more icon images that correspond to the RFID tags that are list-displayed on the display screen in the manner shown in FIG. 3A. By doing this, the RFID tag that corresponds to the icon image that is tapped is specified as an RFID tag that is selected by the user as the target of the search. The tag search device 100 stores the tag ID information of the RFID tag that is selected as the target of the search in a search target storage area in the storage unit 105. Finally, for searching for a location of the RFID tag that is selected as the target of the search, the RFID tag search application is switched to the specific tag search mode, which is described below.

(2-4-B) the Specific Tag Search Mode

The specific tag search mode is a mode that is used for finding the location of the RFID tag whose tag ID information is stored in the storage unit 105 of the tag search device 100 as the search target, as a result that it is specified as the search target by the user. In the following explanation, a tag that is specified by a user as a search target is referred to as a "search target tag."

In the specific tag search mode, first, a user directs the tag search device 100 that is held by the hand to any direction, and the user moves it to the right and to the left, or a user makes one rotation on the spot. At this time, the RFID tag search application that is executed by the tag search device 100 stores strength of a beacon signal that is received from each RFID tag and a direction in which the signal is received in the storage unit 105. Subsequently, the RFID tag search application list-displays the directions and the distances corresponding to the locations of all the search-detected RFID tags around the current location of the user on a radar chart that is displayed on the display screen of the tag search device 100. For displaying the direction and the distance of each of the RFID tags on the radar chart, an icon image that represents the tag ID information of the RFID tag is displayed at a position in the radar chart that corresponds to the direction and the distance.

FIG. 3B shows a situation in which the tag search device 100 list-displays, as the radar chart on the display screen, the locations of all the RFID tags that are located within a searchable area. In FIG. 3B, an icon image 500 that is located at the center of the radar chart represents a current location of a user who is holding the tag search device with a hand. The concentric circles that are displayed in the radar chart represent circular ranges around the location of the user that is represented by the icon image 500. Here, the circular ranges are enlarged step-by-step. The number that is attached to each concentric circle represents a radius of the corresponding range. In FIG. 3A, the icon images $400_1$, $400_2$, $400_3$ and $400_4$ represent current locations of the four RFID tags, respectively, that are located within the searchable area. The icon image $400_1$ represents a current location of the tag $200_1$ that is attached to a key. The icon image $400_2$ represents a current location of the tag $200_2$ that is attached to a remote controller. The icon image $400_3$ represents a current location of the tag $200_3$ that is attached to an umbrella. The icon image $400_4$ represents a current location of the tag $200_4$ that is attached to a purse.

(2-5) An Internal Functional Block Configuration of the Tag Search Device 100

An embodiment of a functional block configuration 300 of the tag search device 100 is explained.

Figure 4:
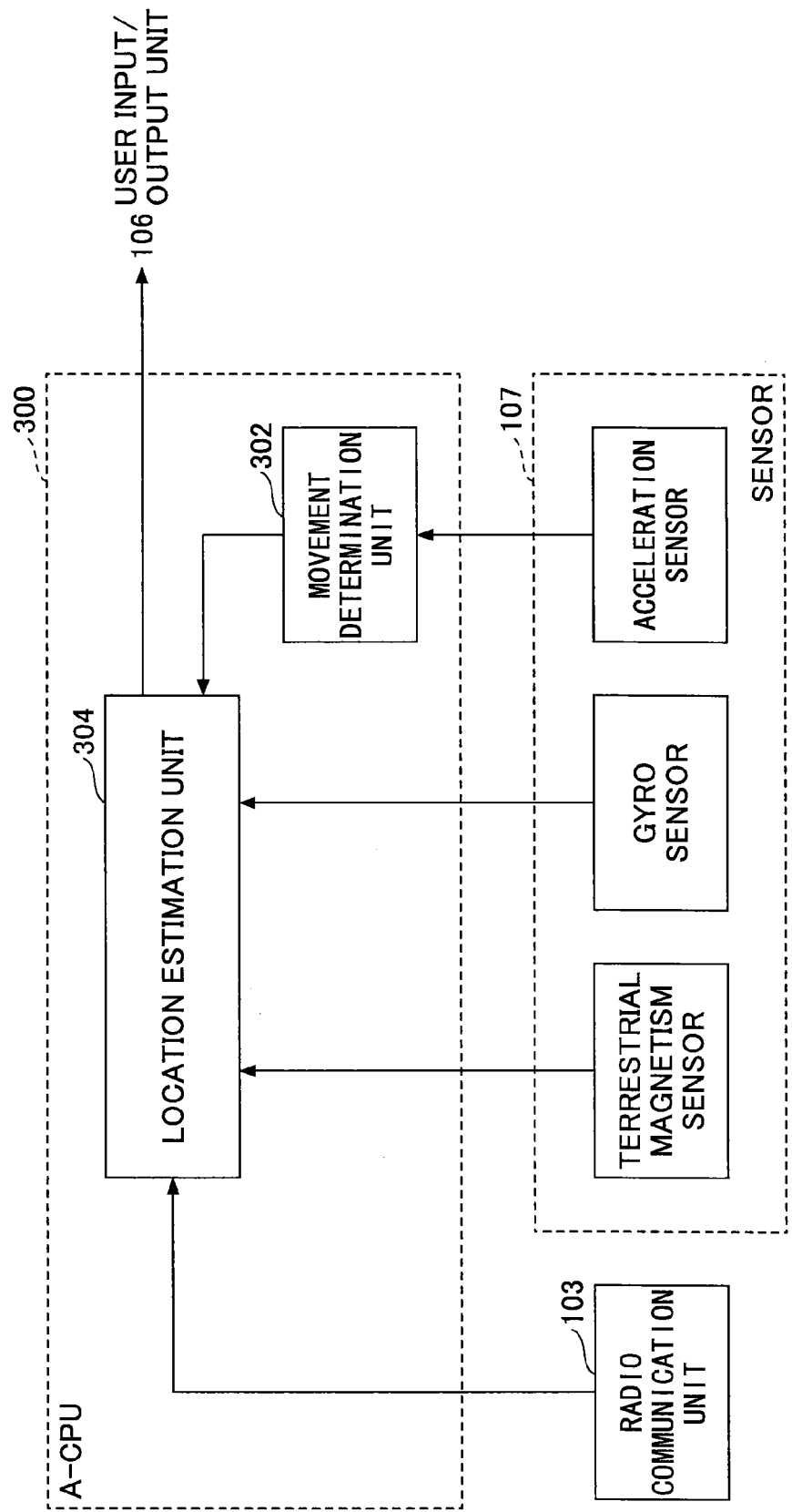
FIG. 4 is a diagram showing a functional block configuration of the tag search device according to the embodiment of the present invention.

FIG. 4 is a diagram showing the functional block configuration 300 of the tag search device 100. The functions that are represented by the functional block diagram are mainly executed by the controller 101. Namely, the functions that are represented by the functional block diagram of FIG. 4 are executed by the controller 101 in accordance with the RFID tag search application that is stored in the storage unit 105. A CPU that executes the functions that are represented by the functional block diagram of FIG. 4 in accordance with the application that is stored in the storage unit 105 may be referred to as an application-CPU (A-CPU) 300.

A movement determination unit 302 can detect a physical motion of the tag search device 100 that is caused by a user who is holding the tag search device 100 by changing the orientation or position of the tag search device 100 or by the movement of the user, based on measurement information from the sensor 107. Information that represents acceleration can be input from the sensor 107 to the movement determination unit 302. The movement determination unit 308 can determine whether the tag search device 100 moves based on the information that represents the acceleration from the sensor 107. The movement determination unit 302 can input the information that represents whether the tag search device 100 moves to a location estimation unit 304.

The information that represents whether the tag search device 100 moves is input to the location estimation unit 304 from the movement determination unit 302. For example, suppose that a user makes a large motion for moving the tag search device 100 to the left and right so as to search for a direction in which the RFID tag is located. At this time, the location estimation unit 304 detects the timing of the start of the movement of the tag search device 100 and the timing of the completion of the movement of the tag search device 100 based on the information from the movement determination unit 302. After detecting the timing of the start of the movement of the tag search device 100 and the timing of the completion of the movement, the location estimation unit 304 estimates the location of the tag 200n, based on the electric field strength that is detected by the radio communication unit 103, and information that represents the absolute direction and information that represents angular acceleration that are detected by the sensor 107, between the timing of the start of the movement and the timing of the completion of the movement.

The location estimation unit 304 can estimate the location of the RFID tag based on the electric field strength of the signal that is received from the RFID tag and the information from the sensor 107. The location estimation unit 304 can estimate a distance between the tag search device 100 and the tag 200n based on the information that represents the electric field strength from the radio communication unit 103. Specifically, the location estimation unit 304 may have a database that includes a relationship between the electric field strength and the distance.

Figure 5:
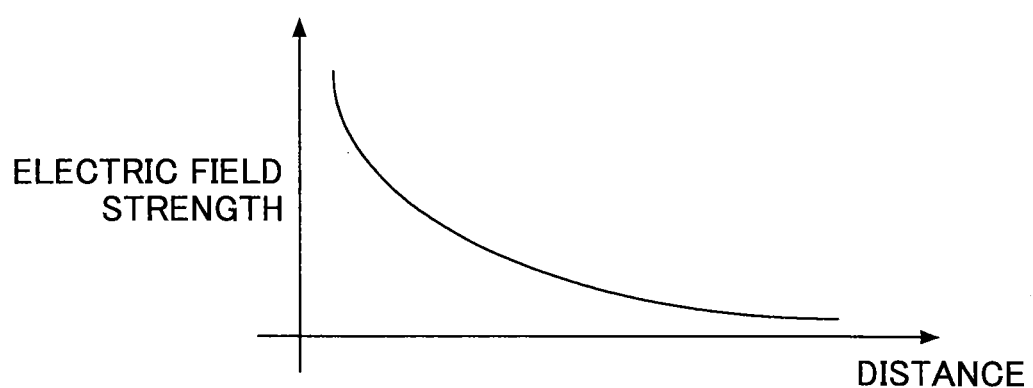
FIG. 5 is a diagram showing a relationship between electric field strength of a signal that is received from the RFID tag and a distance to the RFID tag.

FIG. 5 shows an example of a relationship between the electric field strength and the distance. In FIG. 5, it is shown that, as the electric field strength becomes greater, the distance between the tag search device 100 and the tag 200n becomes smaller (close), and that, as the electric field strength becomes smaller, the distance between the tag search device 100 and the tag 200n becomes greater (far).

The location estimation unit 304 can estimate the distance between the tag search device 100 and the tag 200n based on the relationship between the electric field strength and the distance that is described in FIG. 5.

The location estimation unit 304 can calculate a relative bearing of the tag search device 100 based on the information representing the direction from the sensor 107. The location estimation unit 304 can calculate an angle and rotational speed of the tag search device 100 based on the information representing the angular speed from the sensor 107.

The location estimation unit 304 can estimate the location of the tag 200n based on the estimated value of the distance, the information that represents the direction, and the information that represents the angle and the rotational speed. Specifically, it is as follows. First, the location estimation unit 304 receives, in the form of the direction information, the angle, and the rotational speed, for example, changes in the direction and the position of the tag search device 100 that are caused by the user by moving the tag search device 100 to the left and right. Subsequently, the location estimation unit 304 estimates the location of the RFID tag based on the detected angle and the distance that is estimated based on the relationship between the electric field strength and the distance that is shown in FIG. 5. The location estimation unit 304 outputs the information that represents the estimated location of the tag 200n to the display unit 104. The display unit 104 displays the location of the tag 200n on the screen based on the information that represents the location of the tag 200n from the location estimation unit 304.

An example of a process that is to be executed by the tag search device 100 is explained below by referring to FIGS. 6 and 7.

<3> an Example of a Process that is to be Executed by the Tag Search Device

In the example of the process that is explained below, the tag search device automatically sets the transmission interval for transmitting beacon signals to be an optimum value, depending on the number of RFID tags that are simultaneously searched for. Specifically, in the above-described state (2) (the tag search device 100 is executing the intra-area tag list display mode), as the number of RFID tags that are to be list-displayed on the display screen increases, the transmission interval for transmitting the beacon signals is set to be a greater value. Further, in the above-described state (3) (the tag search device 100 is executing the specific tag search mode), as the number of the RFID tags that are selected at the same time by a user as search targets becomes greater, the transmission interval for transmitting the beacon signals is set to be a greater value.

(3-1) Flow of the Process of the Signal Transmission Interval Control Method

Figure 6:
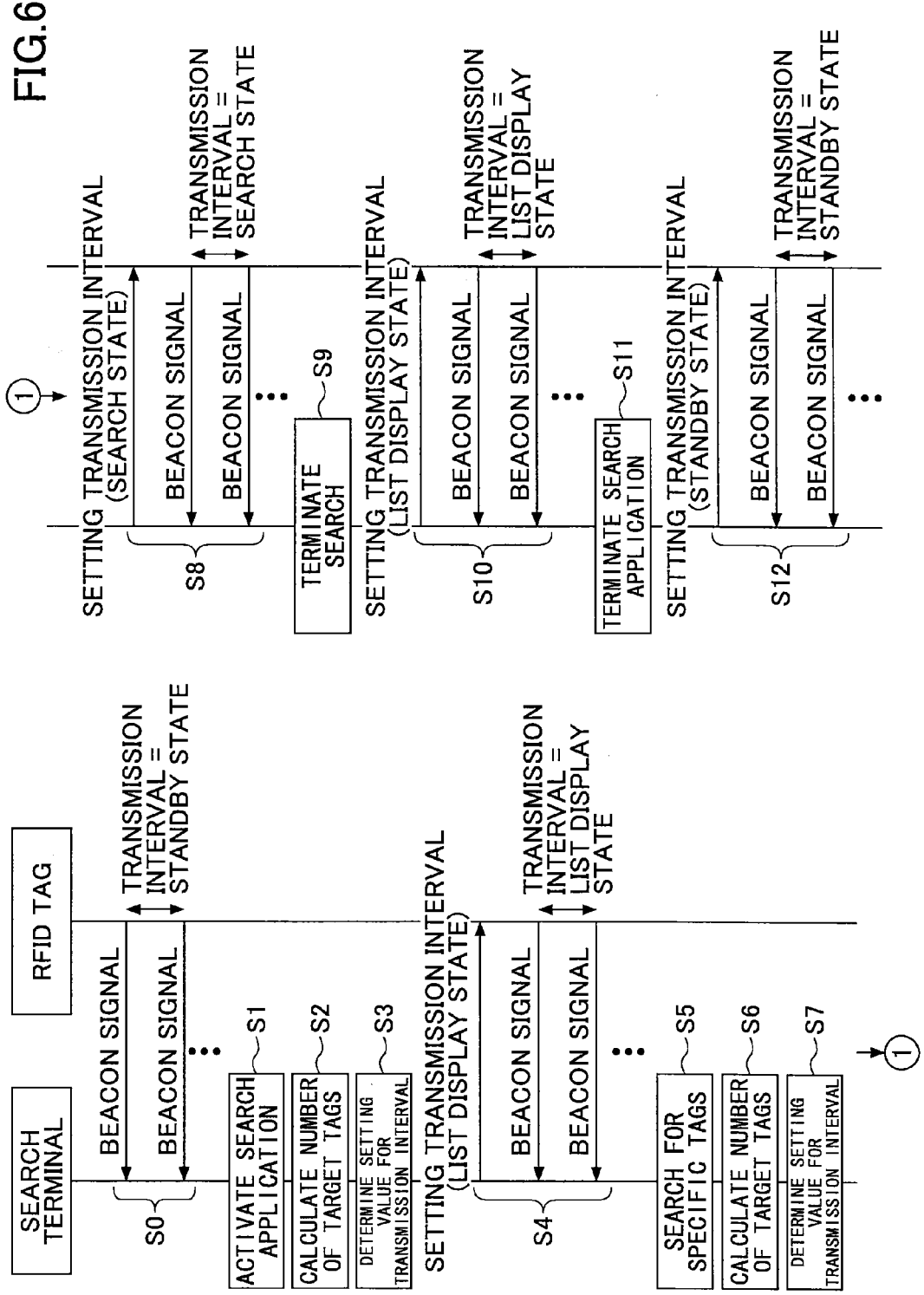
FIG. 6 is a sequence diagram showing a processing flow of an example of a search method that is executed by the tag search device.

The controller 101 in the tag search device 100 can adjust the transmission interval for transmitting the beacon signals depending on a situation, in accordance with a procedure that is shown in the sequence diagram of FIG. 6.

(i) First, in the initial state, each RFID tag is transmitting beacon signals with the transmission interval that corresponds to the above-described standby state (1). Power is supplied to the tag search device 100, and the OS that is stored in the storage unit 105 is activated (S0 of FIG. 6). Subsequently, the controller 101 activates the RFID tag search application when a user instructs the activation of the RFID tag search application through a GUI that is included in the user input/output unit 106 (S1 of FIG. 6). The controller 101 executes detection of all RFID tags (presence detection) that are located in a searchable area in the intra-area tag list display mode by controlling the whole tag search device 100. Specifically, the controller 101 executes detection of all the RFID tags (presence detection) that are located within the searchable area as follows. First, the controller 101 temporarily stores, in the storage unit 105, all items of tag ID information that are included in the beacon signals, respectively, that are received within a predetermined time period from one or more RFID tags that are located within the searchable area. Then, the controller 101 stores, among all the items of the tag ID information that are temporarily stored, the items of the tag ID information that do not mutually overlap as an intra-area tag list in the storage unit 105.

Subsequently, the controller counts the number of the tags that are the subject of the list display, prior to list-displaying the current locations of all the detected RFID tags on the display screen (S2 of FIG. 6). Specifically, the controller 101 counts the number of the RFID tags by counting the number of one or more items of the tag ID information that are stored in the intra-area tag list in the storage unit 105 and that do not mutually overlap. At this time, it is possible to limit the RFID tags that are to be counted as the number of the tags for list-displaying to the RFID tags that are specified by the user as the subject of the list display, among the RFID tags whose items of the tag ID information are registered in advance in the tag ID database of the storage unit 105.

(ii) Subsequently, the controller 101 determines a setting value of the transmission interval for transmitting the beacon signals that corresponds to the number of the tags that is calculated as the number of the RFID tags that are list-displayed on the display screen in the above-described (i) (S3 of FIG. 6). Specifically, the controller 101 refers to, for example, the transmission interval setting value table that defines the correspondence between the number of tags and a setting value of the beacon signal transmission interval, and the controller 101 determines the setting value of the transmission interval for transmitting the beacon signals that corresponds to the number of the RFID tags that are list-displayed on the display screen. At this time, the setting value of the signal transmission interval in the transmission interval setting value table is determined, depending on the number of the RFID tags that are located in the searchable area, in a manner such that a tradeoff is resolved between the increase in a collision probability among simultaneously transmitted signals from RFID tags as the signal transmission interval is shortened and the degradation of the RFID search performance (search accuracy or a search success rate) as the signal transmission interval is elongated.

FIG. 7 shows a specific example of the transmission interval setting value table that defines the correspondence between the number of tags and a setting value of the beacon signal transmission interval. In the table of FIG. 7, for each of the case where the number of tags that are the subject of the list display on the display screen is from 1 to 10, the case where the number of tags that are the subject of the list display on the display screen is from 11 to 20, the case where the number of tags that are the subject of the list display on the display screen is from 21 to 30, and the case where the number of tags that are the subject of the list display on the display screen is greater than or equal to 31, a setting value of the beacon signal transmission interval for the case where the RFID tag is in the above-described standby state (1) (a state in which the RFID tag is not searched for), a setting value of the beacon signal transmission interval for the case where it is in the above-described state (2) (a state in which the RFID tag is searched for in an intra-area search mode), and a setting value of the beacon signal transmission interval for the case where it is in the above-described state (3) (a state in which the RFID tag is searched for in the specific tag search mode) are stored in fields of "standby," "list display" and "search," respectively. For example, according to the table of FIG. 7, when the number of tags that are the subject of the list display on the display screen is 15, and when each of the RFID tags is in the above-described state (2) (the state in which the RFID tag is searched for in the intra-area search mode), the transmission interval for transmitting the beacon signals from the RFID is set to be 200 milliseconds.

(iii) Subsequently, the controller 101 instructs all the RFID tags that are located in the searchable area to change the setting of the transmission interval for transmitting the beacon signals through the transmission interval control signal transmitter 110 and the radio communication unit 103. Specifically, the controller 101 includes the setting value of the beacon signal transmission interval that is determined in the above-described (ii) in a command signal, and transmits it to all the RFID tags that are located within the searchable area. In response to this, all the RFID tags within the searchable area transmit beacon signals with the transmission interval that is indicated by the setting value of the transmission interval in the command signal (S4 of FIG. 6). After the controller 101 confirms that the RFID tags that receive the above-described command signal start transmitting signals with the instructed transmission interval, the controller 101 estimates approximate distances to the locations of all the RFID tags that are located within the searchable area, and the controller 101 instructs the display unit 104 to display a list on the display screen based on these estimated distances.

(iv) Subsequently, when the user selects one or more RFID tags that are to be searched for among the RFID tags that are list-displayed on the display screen (the user taps one or more icon images among the icon images corresponding to the RFID tags that are list-displayed on the display screen), the RFID tag search application is switched to the specific tag search mode (S5 of FIG. 6).

(v) In the above-described (iv), during switching of the RFID tag search application to the specific tag search mode, the controller 101 calculates the number of the RFID tags that are specified as the search targets at the same time by the user (S6 of FIG. 6).

(vi) Subsequently, the setting value of the beacon signal transmission interval is determined that corresponds to the number of the tags that is calculated in the above-described (v) as the number of the RFID tags that are specified as the search targets at the same time by the user (S7 of FIG. 6). Specifically, the controller 101 determines the setting value of the beacon signal transmission interval that corresponds to the number of the RFID tags that are specified as the search targets at the same time by the user, for example, by referring to the transmission interval setting value table that defines the correspondence between the number of tags and the setting value of the beacon signal transmission interval. At this time, a configuration of the transmission interval setting value table that is used for determining the setting value of the beacon signal transmission interval can be made the same as the configuration of the table that is shown in FIG. 7.

(vii) Subsequently, the controller 101 instructs the one or more RFID tags that are specified as the search targets at the same time by the user to change the setting of the transmission interval for transmitting the beacon signals through the transmission interval control signal transmitter 110 and the radio unit 103. Specifically, the controller 101 includes the setting value of the beacon signal transmission interval that is determined in the above-described (vi) in a command signal, and transmits the command signal to the one or more RFID tags that are specified as the search targets at the same time by the user. In response to this, the one or more RFID tags that are specified as the search targets at the same time by the user transmit beacon signals with the transmission interval that is specified by the setting value of the transmission interval in the command signal (S8 of FIG. 6).

(viii) After the controller 101 confirms that the RFID tags that receive the above-described command signal start transmitting signals with the instructed transmission interval, the RFID tag search application that is executed by the controller 101 executes, in accordance with the specific tag search mode, a process for estimating a direction and a distance of the RFID tag that is specified as the search target by the user.

(ix) After the user identifies the location of the RFID tag that is specified as the search target by the user, the RFID tag search application terminates execution of the specific tag search mode, and returns to a state in which the intra-area tag list display mode is executed (S9 of FIG. 6). Subsequently, settings are made for the RFID tags that are located within the searchable area of the tag search device 100 by the procedures that are the same as those of the above-described (i) and (ii), so that the RFID tags transmit the beacon signals with the signal transmission interval that corresponds to the intra-area tag list display mode (S10 of FIG. 6).

(x) Subsequently, when the user determines that it is not necessary to newly search for the RFID tag, and terminates the RFID tag search application through the GUI of the user input/output unit 106 (S11 of FIG. 6), the RFID tag search application makes a setting for the RFID tags that are located within the area in which the tag search device 100 can execute communication, so that the RFID tags transmit the beacon signals with the signal transmission interval that corresponds to the standby state, as a process at the termination of the application (S12 of FIG. 6). In another example, a configuration can be considered such that the operation for returning to the signal transmission interval of the RFID tag to the setting that corresponds to the standby state is executed as follows, instead of executing it by the application itself as the execution termination process. For example, a configuration can be considered such that, after a certain time period has elapsed from the termination of the execution of the RFID tag search application, the controller 101 automatically executes the operation independently of the application. Alternatively, a configuration can be considered such that the RFID tag that is notified of the termination of the execution of the RFID search application by the tag search device 100 automatically and actively executes the operation at the side of the RFID after a certain time period has elapsed from the notification.

(3-2) Effects

The above-described signal transmission interval control method can automatically set an optimum value of the transmission interval for transmitting signals from the RFID tags by considering the list display on the search screen of the tag search device 100 or the number of the RFID tags that are to be the search targets. In this manner, the above-described signal transmission interval control method can reduce the probability of collision that is caused by simultaneous transmissions from many RFID tags, and can resolve the tradeoff between the battery energy consumption that is caused by the short signal transmission interval and the degradation of the tag search performance that is caused by the long signal transmission interval. As a consequence, the method according to the first embodiment can prevent increase of the collision probability that is caused by frequent simultaneous transmissions from many RFID tags that are located within the search range without implementing, in the RFID tag, the radio channel synchronization function or power control function that is the same level of that of the mobile terminal.

<4> Another Example of the Process that is Executed by the Tag Search Device

Another example of the process that is executed by the tag search device 100 is explained below by referring to FIGS. 8 to 10.

Prior to moving outside an area in which the tag search device 100 can execute communication, an RFID tag that is located at a remote distance from the tag search device 100 can automatically set a transmission interval for transmitting beacon signals to be an optimum value based on a distance to the RFID tag and/or separation speed of the RFID tag, so as to quickly and frequently report changes in the position of the RFID tag to a user. Specifically, as the RFID tag is separated away from the tag search device 100, the tag search device 100 instructs the RFID tag to make a setting for a shorter transmission interval for transmitting the beacon signals from the RFID tag, and as the separation speed of the RFID tag from the tag search device 100 becomes greater, the RFID tag is instructed to make a setting for a shorter transmission interval for transmitting the beacon signals. In this manner, the degradation of the search performance (search accuracy and a search success rate) of searching for the RFID tag that is located at a remote distance from the tag search device 100 can be compensated for by an increase in a frequency of signal transmission. The tag search device 100 can quickly and frequently report the distance to the RFID tag and its change to the user, prior to loosing the RFID tag that is highly likely to move outside the search range.

At this time, the distance between the tag search device 100 and each RFID tag is estimated based on the strength of the radio wave that is received from the respective RFID tag. Further, the moving speed of the RFID tag along a direction in which the RFID tag is separated from the tag search device 100 is estimated based on a reduced amount of the reception strength of the signal from the RFID tag. For each tag, a separate transmission interval is set depending on the distance between the tag search device 100 and the RFID tag and/or the change in the distance (speed).

The transmission interval for transmitting the beacon signals from the RFID tag can be determined in accordance with the following two methods.

(A) When the transmission interval is controlled depending only on the distance between the tag search device 100 and the RFID tag, the tag search device 100 instructs the RFID tag to make a setting for a shorter transmission interval, as the reception strength of the signal from the RFID tag becomes smaller (the distance becomes greater).

(B) When the transmission interval is controlled depending on the separation speed of the RFID tag from the tag search device 100 (the rate of increase of the distance to the RFID tag), the tag search device 100 instructs the RFID tag to make a setting for a shorter transmission interval, as the reduced amount of the reception strength of the signal from the RFID tag that is measured over a constant time period becomes greater (the separation speed becomes greater).

When the tag search device 100 controls the transmission interval for transmitting the beacon signals in accordance with any one of the above-described method (A) and method (B), a short transmission interval may be assigned to an RFID tag for which the received strength of the beacon signal is greater than or equal to a certain value, and a default transmission interval may be assigned to an RFID tag for which it is less than or equal to a certain value. The reason for such a configuration of the transmission interval control method is as follows. As shown in FIG. 5, for the reception strength (the electric field strength) of the beacon signal, a rate of change per unit distance becomes smaller, as the distance between the tag search device 100 and the RFID tag becomes greater. Therefore, when the value of the reception strength of the beacon signal is below a certain value, the value of such reception strength (the electric field strength) may not have sufficient precision and significance as a reference for strictly estimating the distance to the RFID tag and the amount of its change.

Further, the controller 101 may store, in advance, the relationship between the strength of the radio wave that is received from the RFID tag (or its change) and a setting value of the beacon signal transmission interval that is to be set in a database, and the controller 101 may obtain the setting value by reading out the corresponding setting value from the database. Further, as another embodiment, the controller 101 may calculate a setting value of the beacon signal transmission interval that is to be set based on a specific formula that uses the strength of the radio wave that is received from the RFID tag (or its change) as an input parameter.

Furthermore, as an embodiment that is obtained by combining the above-described method (A) and method (B), a short signal transmission interval may be assigned only to an RFID tag such that the radio wave strength of the beacon signal that is received from the RFID tag is small, and the reduced amount of the radio wave strength within a constant time period is large. Conversely, a long signal transmission interval may be assigned only to an RFID tag such that the radio wave strength is large, and the reduced amount of the radio wave strength within a constant time period is small.

Figure 8:
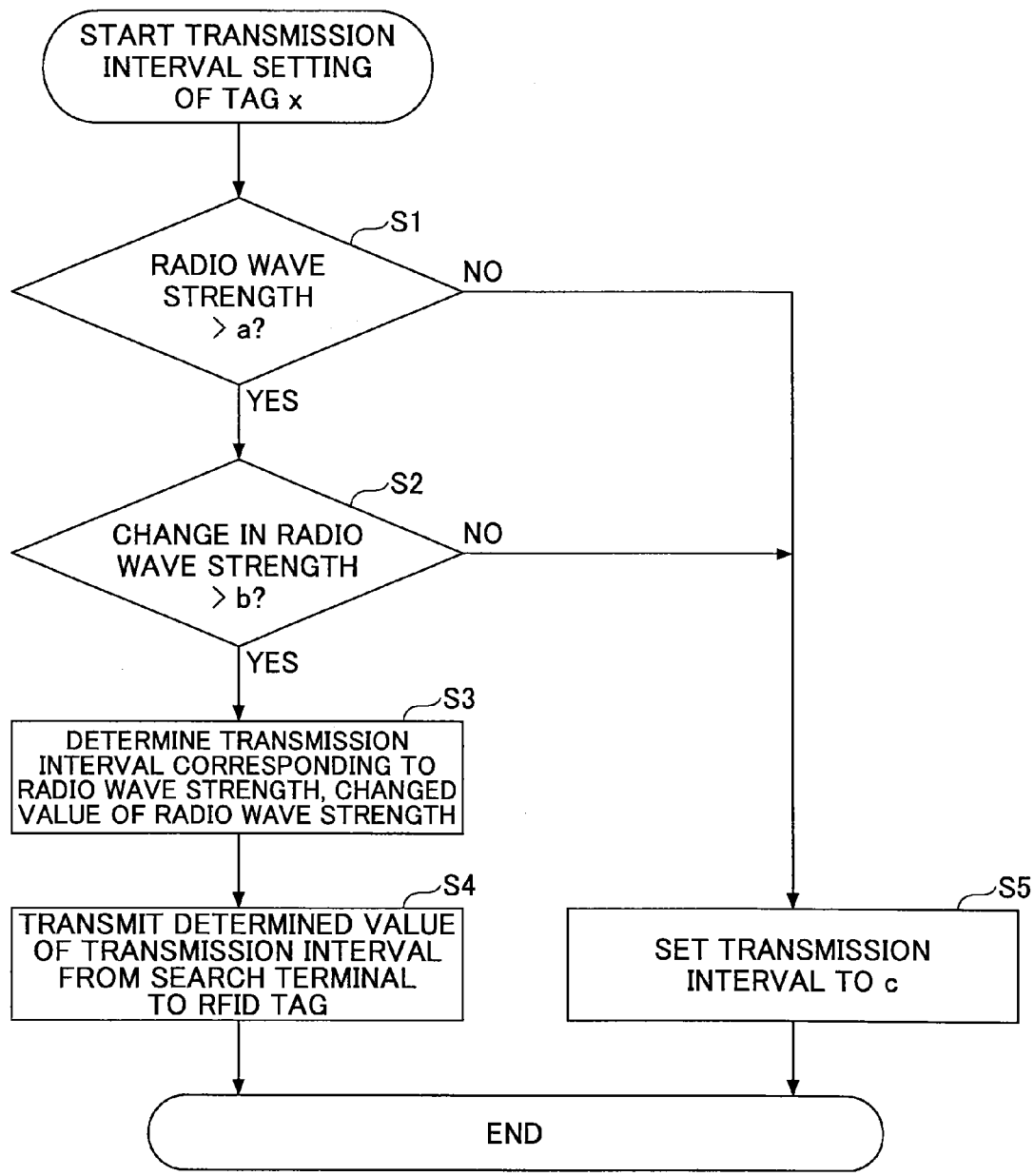
FIG. 8 is a flowchart showing a processing flow of another example of the search method that is executed by the tag search device.

The flowchart of FIG. 8 shows an example of the transmission interval control method such that the controller 101 instructs to make a setting for a short signal transmission interval only to an RFID tag such that the radio wave strength of the beacon signal that is received from the RFID tag is small, and the reduced amount of the radio wave strength within a constant time period is large. In FIG. 8, a threshold value for the radio wave strength of the beacon signal that is received from the RFID tag is denoted as "a," a threshold value for the reduced amount of the radio wave strength in a constant time period is denoted as "b," and the default signal transmission interval is denoted as "c." A list of specific setting values of "the threshold value a," "the threshold value b" and "the transmission interval c" is shown in FIG. 9. The list of FIG. 9 is stored in the storage unit 105. When the controller 101 executes the transmission interval control method in accordance with the flowchart of FIG. 8, the controller 101 refers to the list.

(4-2) Flow of the Process of the Signal Transmission Interval Control Method

The control of the signal transmission interval may be achieved, for example, by repeating, by the controller 101 in the tag search device 100, the execution of the procedures shown in the flowchart of FIG. 8 at predetermined time intervals. As a result, the transmission interval for transmitting the beacon signals for each RFID tag can be controlled depending on a situation.

First, at step S1, the controller 101 determines whether the radio wave strength of the beacon signal that is received from each RFID tag is greater than the "threshold value a." At this time, the controller 101 obtains a measured value of the radio wave strength by receiving the strength of the received radio wave from the RFID tag that is measured by the radio communication unit 103 through the beacon signal receiver 102. When the radio wave strength is greater than the "threshold value a," the process proceeds to step S2. Otherwise, the process proceeds to step S5.

Subsequently, at step S2, the controller 101 determines whether the reduced amount of the radio wave strength of the beacon signal that is received from each RFID tag is greater than the "threshold value b." The reduced amount of the radio wave strength can be obtained by calculating a difference between the radio wave strength that is measured in the current loop execution and the radio wave strength that is measured in the previous loop execution, in the flow chart of FIG. 8 that is iteratively executed in loops. Alternatively, as anther embodiment, the reduced amount of the radio wave strength may be calculated by the least square method or the like by using three or more values of the radio wave strength that are measured by three or more iteration of the flowchart of FIG. 8 as sample values. As a result of determining, by the controller 101, whether the calculated reduced amount of the radio wave strength is greater than the "threshold value b," when the reduced amount of the radio wave strength is greater than the "threshold value b," the process proceeds to step S3. Otherwise, the process proceeds to step S5.

Subsequently, at step S3, in order to determine an optimum transmission interval for beacon signals based on the radio wave strength of the beacon signal and its reduced amount, the controller 101 selects the optimum setting value for the transmission interval in the setting value table that is shown in FIG. 10 depending on the radio wave strength and its reduced amount. Specifically, it is performed as follows. Each column of the two-dimensional table of a matrix form shown in FIG. 10 corresponds to various values of the radio wave strength of the beacon signal, and each row corresponds to various values of the reduced amount of the radio wave strength. The first column of the table of FIG. 10 shows a situation in which, when the radio wave strength of the signal that is received from the RFID tag is −51 dBm, as the reduced amount of the radio wave strength changes as 11 dB, 12 dB, 13 dB, . . . , the setting value of the beacon signal transmission interval changes as 900 milliseconds, 850 milliseconds, 800 milliseconds, . . . . Similarly, the second column of the table of FIG. 10 shows a situation in which, when the radio wave strength of the signal that is received from the RFID tag is −52 dBm, as the reduced amount of the radio wave strength changes as 11 dB, 12 dB, 13 dB, . . . , the setting value of the beacon signal transmission interval changes as 850 milliseconds, 800 milliseconds, 750 milliseconds, . . . . Similarly, the third column of the table of FIG. 10 shows a situation in which, when the radio wave strength of the signal that is received from the RFID tag is −53 dBm, as the reduced amount of the radio wave strength changes as 11 dB, 12 dB, 13 dB, . . . , the setting value of the beacon signal transmission interval changes as 800 milliseconds, 750 milliseconds, 700 milliseconds, . . . . This corresponds to that, as viewed from the tag search device 100, as the distance to the RFID tag becomes greater, the transmission interval of the beacon signal is set to be shorter, and at this time, as the separating speed of the RFID tag from the tag search device 100 becomes greater, the signal transmission interval is set to be more shorter.

Accordingly, the controller 101 selects the optimum setting value for the signal transmission interval by selecting a row that corresponds to the radio wave strength of the signal that is received from the RFID tag, and additionally by selecting the setting value of the column that corresponds to the reduced amount of the radio wave strength in the selected row in the table of FIG. 10. For example, when the radio wave strength of the signal that is received from the RFID tag is −52 dBm, and when the reduced amount of the radio wave strength is 12 dB, the controller 101 selects the value of 800 milliseconds from the second column of the second row of the table of FIG. 10 as the setting value of the signal transmission interval.

Subsequently, at step S4, the controller 101 instructs each RFID tag to change the setting of the transmission interval of the beacon signal through the transmission interval control signal transmitter 110 and the radio communication unit 103. Specifically, the controller 101 includes the setting value of the transmission interval of the beacon signal that is determined at step S3 in a command signal, and transmits the command signal to each RFID tag. In response to this, each RFID tag transmits the beacon signals with the transmission interval that is instructed by the setting value of the transmission interval in the command signal.

When a determination is made at step S1 that the radio wave strength is less than or equal to the threshold value a, or when a determination is made at step S2 that the reduced amount of the radio wave strength is less than or equal to the threshold value b, the process proceeds to step S5. The controller 101 selects the default transmission interval c that is shown in FIG. 9 as the setting value of the transmission interval of the beacon signal from the RFID tag, and the controller 101 instructs each RFID tag to change the setting of the transmission interval of the beacon signal to be the default transmission interval c.

Note that, when the signal transmission interval of each RFID tag is selected at step S3, the tag search device 100 may update the display of the current location of each RFID tag on the display screen in a cycle that is shorter than the selected signal transmission interval. That is because, at step S3, it is possible that a short signal transmission interval is selected for an RFID tag that is highly likely to move outside the searchable area of the tag search device 100. Thus, the changes in the location of the RFID tag is to be quickly and frequently reported to the user before the user looses the RFID tag from the searchable area.

In the flowchart of FIG. 8, it is assumed that, when the radio wave strength is less than or equal to the "threshold value a," or when the reduced amount of the radio wave strength is less than or equal to the "threshold value b," the process proceeds to step S5. As a modified example to this, for example, when the radio wave strength is greater than the "threshold value a," or when the reduced amount of the radio wave is less than the "threshold value b," the process may proceed to step S5.

(4-3) Effect

In the above-described example of the signal transmission interval control, the tag search device 100 automatically sets the transmission interval for transmitting signals from the RFID tag to be an optimum value by considering the distance to each RFID tag that is the search target, and the separating speed of the RFID tag from the tag search device 100. Namely, as the separation of the RFID tag from the tag search device 100 becomes greater, the signal transmission interval is set to be shorter, and at this time, as the separating speed of the RFID tag from the tag search device 100 becomes greater, the signal transmission interval is set to be more shorter. As a consequence, the tag search device 100 can compensate for the degradation of the search performance (search accuracy, and a search success rate) in searching for the RFID tag that is located at a remote distance by an increase in frequency of transmitting signals. Further, the tag search device 100 can quickly and frequently report the distance to the RFID tag and its changes to the user, prior to loosing the RFID tag that is highly likely to move outside the search range.

With respect to the above-described embodiments, the following items are further disclosed.

(1) A method to be executed by a user terminal for searching for locations of one or more wireless devices that are located within an area in which the one or more wireless devices can wirelessly communicate with the user terminal, wherein each of the one or more wireless devices periodically transmits a beacon signal, the method including a step of detecting a number of the one or more wireless devices that are located within the area based on the beacon signals;

a step of determining a transmission period for transmitting the beacon signals depending on the number of the one or more wireless devices; and a step of instructing the one or more wireless devices that are located within the area to transmit the beacon signals in accordance with the determined transmission period.

(2) In the method described in (1), the step of determining the transmission period may include a step of determining, when the number of the wireless devices are located within the area, the transmission period in a manner to resolve a tradeoff between an increase in a collision probability of simultaneous transmissions from the wireless devices that is caused by a short transmission interval and degradation of search performance of the user terminal that is caused by a long transmission interval.

(3) In the method described in (1),
the step of detecting the number of the one or more wireless devices may include a step, by the user terminal, of decoding items of wireless device identification information that are included in the beacon signals that are received by the user terminal within a predetermined time period from the one or more wireless devices that are located within the area, and counting a number of the items of the wireless device identification information that do not overlap with each other, wherein each of the items of the wireless device identification information includes information that uniquely identifies the corresponding wireless device.

(4) A non-transitory recording medium that stores a program to be executed by a control circuit within a user terminal for searching for locations of one or more wireless devices that are located within an area in which the one or more wireless devices can wirelessly communicate with the user terminal, wherein each of the one or more wireless devices periodically transmits a beacon signal, wherein the program causes the control circuit to execute
a step of detecting a number of the one or more wireless devices that are located within the area based on the beacon signals;
a step of determining a transmission period for transmitting the beacon signals depending on the number of the one or more wireless devices; and
a step of instructing the one or more wireless devices that are located within the area to transmit the beacon signals in accordance with the determined transmission period.

(5) In the non-transitory recording medium described in (4),
the program may cause the control circuit to further execute:
a step of estimating locations of the one or more wireless devices based on the beacon signals; and
a step of list-displaying the estimated locations of the one or more wireless devices to a user.

(6) A user terminal that is used for searching for locations of one or more wireless devices that are located within an area in which the one or more wireless devices can wirelessly communicate with the user terminal, wherein each of the one or more wireless devices periodically transmits a beacon signal, the user terminal including
a detection unit configured to detect a number of the one or more wireless devices that are located within the area based on the beacon signals;
a determination unit configured to determine a transmission period for transmitting the beacon signals depending on the number of the one or more wireless devices; and
an instruction unit configured to instruct the one or more wireless devices that are located within the area to transmit the beacon signals in accordance with the determined transmission period.

(7) The user terminal described in (6) may further include
an estimation unit configured to estimate locations of the one or more wireless devices based on the beacon signals; and
a display unit configured to list-display the estimated locations of the one or more wireless devices to a user.

(8) A method to be executed by a user terminal for searching for locations of one or more wireless devices that are located within an area in which the one or more wireless devices can wirelessly communicate with the user terminal, wherein each of the one or more wireless devices periodically transmits a beacon signal, the method including a step of detecting a radio wave strength of a signal that is received from, at least, each of the one or more wireless devices within the area;
a step of determining transmission periods for transmitting the beacon signals based on the detected radio wave strength; and
a step of instructing each of the one or more wireless devices that are within the area to transmit the beacon signal in accordance with the determined transmission period.

(9) The method described in (8) may further include
a step of estimating locations of the one or more wireless devices within the area based on the beacon signals; and
a step of list-displaying the estimated locations of the one or more wireless devices to a user.

(10) In the method described in (8),
the step of determining the transmission periods may include a step of setting shorter transmission periods for the beacon signals as the detected radio wave strength becomes smaller, or setting more shorter transmission periods for the beacon signals as a change in the detected radio wave strength becomes greater.

(11) In the method described in (8),
when the detected radio wave strength or a changed amount of the detected radio wave strength exceeds a predetermined threshold value, the step of determining the transmission periods may include a step of setting the transmission periods to a default value, independently of the radio wave strength or the changed amount of the radio wave strength.

(12) A non-transitory recording medium that stores a program to be executed by a control circuit within a user terminal for searching for locations of one or more wireless devices that are located within an area in which the one or more wireless devices can wirelessly communicate with the user terminal, wherein each of the one or more wireless devices periodically transmits a beacon signal, wherein the program causes the control circuit to execute:
a step of detecting a radio wave strength of a signal that is received from, at least, each of the one or more wireless devices within the area;
a step of determining transmission periods for transmitting the beacon signals based on the detected radio wave strength; and
a step of instructing each of the one or more wireless devices that are within the area to transmit the beacon signal in accordance with the determined transmission period.

(13) In the non-transitory recording medium described in (12),
the program may cause the control circuit to further execute:
a step of estimating locations of the one or more wireless devices within the area based on the beacon signals; and
a step of list-displaying the estimated locations of the one or more wireless devices to a user.

(14) A user terminal that is used for searching for locations of one or more wireless devices that are located within an area in which the one or more wireless devices can wirelessly communicate with the user terminal, wherein each of the one or more wireless devices periodically transmits a beacon signal, the user terminal including
a detection unit configured to detect a radio wave strength of a signal that is received from, at least, each of the one or more wireless devices within the area;
a determination unit configured to determine transmission periods for transmitting the beacon signals based on the detected radio wave strength; and an instruction unit configured to instruct each of the one or more wireless devices that are within the area to transmit the beacon signal in accordance with the determined transmission period.

(15) The user terminal described in (14) may further include an estimation unit configured to estimate locations of the one or more wireless devices within the area based on the beacon signals; and a display unit configured to list-display the estimated locations of the one or more wireless device to a user.

The RFID tag search method for searching for the location of the RFID tag by using a wireless device, and a RFID tag search device that executes the RFID tag search method are explained above by the embodiments. However, the present invention is not limited to the above-described embodiments, and various modifications and improvements can be made within the scope of the present invention. Specific examples of numerical values are used in order to facilitate understanding of the invention. However, these numerical values are simply illustrative, and any other appropriate values may be used, except as indicated otherwise. The separations of the items in the above explanation are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. For the convenience of explanation, the communication terminal and the information processing device are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like.

The present international application is based on and claims the benefit of priority of Japanese Patent Application No. 2013-090795, filed on Apr. 23, 2013, the entire contents of Japanese Patent Application No. 2013-090795 are incorporated by reference.

LIST OF REFERENCE SYMBOLS

100: Tag search device
101: Controller
102: Beacon signal receiver
103: Radio communication unit
104: Display unit
105: Storage unit
106: User input/output unit
107: Sensor
108: Transmission/reception antenna
200: RFID tag
201: Controller
202: Beacon signal transmitter
203: Radio communication unit
204: Clock unit
205: Storage unit
206: Battery
207: Transmission/reception antenna
300: Functional block configuration of the tag search device
302: Movement determination unit
304: Location estimation unit
400: Icon image representing the location of the RFID tag

The invention claimed is:

1. A method to be executed by a user terminal for controlling one or more wireless devices that are located within an area in which the one or more wireless devices can wirelessly communicate with the user terminal, each of the one or more wireless devices periodically transmitting a beacon signal, the method comprising:
   detecting a number of the one or more wireless devices that are located within the area based on the beacon signals;
   determining a transmission period for transmitting subsequent beacon signals based on a correspondence between the number of the one or more wireless devices to one of a plurality of transmission periods defined in a transmission period data structure;
   instructing the one or more wireless devices that are located within the area to transmit the subsequent beacon signals in accordance with the determined transmission period;
   estimating locations of the one or more wireless devices based on the beacon signals; and
   list-displaying the estimated locations of the one or more wireless devices to a user.

2. The method according to claim 1, wherein the determining of the transmission period includes
   determining, when the number of the wireless devices are located within the area, the transmission period in a manner to resolve a tradeoff between an increase in a collision probability of simultaneous transmissions from the wireless devices that is caused by a short transmission interval and degradation of search performance of the user terminal that is caused by a long transmission interval.

3. The method according to claim 1, wherein the detecting of the number of the one or more wireless devices includes
   decoding items of wireless device identification information that are included in the beacon signals that are received by the user terminal within a predetermined time period from the one or more wireless devices that are located within the area, and
   counting a number of the items of the wireless device identification information that do no overlap with each other, wherein each of the items of the wireless device identification information includes information that uniquely identifies the corresponding wireless device.

4. A user terminal that is used for controlling one or more wireless devices that are located within an area in which the one or more wireless devices can wirelessly communicate with the user terminal, each of the one or more wireless devices periodically transmitting a beacon signal, the user terminal comprising:
   circuitry configured to:
      detect a number of the one or more wireless devices that are located within the area based on the beacon signals;
      determine a transmission period for transmitting subsequent beacon signals based on a correspondence between the number of the one or more wireless devices to one of a plurality of transmission periods defined in a transmission period data structure;

instruct the one or more wireless devices that are located within the area to transmit the subsequent beacon signals in accordance with the determined transmission period;

estimate locations of the one or more wireless devices based on the beacon signals; and control a display to list-display the estimated locations of the one or more wireless devices to a user.

5. A method to be executed by a user terminal for controlling one or more wireless devices that are located within an area in which the one or more wireless devices can wirelessly communicate with the user terminal, each of the one or more wireless devices periodically transmitting a beacon signal, the method comprising:

detecting a radio wave strength of a signal that is received from, at least, each of the one or more wireless devices within the area;

determining transmission periods for transmitting subsequent beacon signals based on the detected radio wave strength defined in a transmission period data structure;

instructing each of the one or more wireless devices that are within the area to transmit the subsequent beacon signal in accordance with the determined transmission periods;

estimating locations of the one or more wireless devices within the area based on the beacon signals; and list-displaying the estimated locations of the one or more wireless devices to a user.

6. The method according to claim 5, wherein the determining of the transmission periods includes setting shorter transmission periods for the beacon signals as the detected radio wave strength becomes smaller, or setting more shorter transmission periods for the beacon signals as a change in the detected radio wave strength becomes greater.

7. The method according to claim 5, wherein, when the detected radio wave strength or a changed amount of the detected radio wave strength exceeds a predetermined threshold value, the determining of the transmission periods includes setting the transmission periods to a default value, independently of the radio wave strength or the changed amount of the radio wave strength.

8. A user terminal that is used for controlling one or more wireless devices that are located within an area in which the one or more wireless devices can wirelessly communicate with the user terminal, each of the one or more wireless devices periodically transmitting a beacon signal, the user terminal comprising:

circuitry configured to:

detect a radio wave strength of a signal that is received from, at least, each of the one or more wireless devices within the area;

determine transmission periods for transmitting subsequent beacon signals based on the detected radio wave strength defined in a transmission period data structure;

instruct each of the one or more wireless devices that are within the area to transmit the subsequent beacon signal in accordance with the determined transmission periods;

estimate locations of the one or more wireless devices within the area based on the beacon signals; and control a display to list-display the estimated locations of the one or more wireless devices to a user.

* * * * *